US012420996B2

(12) United States Patent
Mitten et al.

(10) Patent No.: US 12,420,996 B2
(45) Date of Patent: Sep. 23, 2025

(54) LABEL HAVING TEAR STRIP

(71) Applicant: Altria Client Services LLC, Richmond, VA (US)

(72) Inventors: Robert T. Mitten, Mechanicsville, VA (US); Christopher J. Hession, Mechanicsville, VA (US); Christopher L. Simpson, Richmond, VA (US)

(73) Assignee: Altria Client Services LLC, Richmond, VA (US)

( * ) Notice: Subject to any disclaimer, the term of this patent is extended or adjusted under 35 U.S.C. 154(b) by 0 days.

(21) Appl. No.: 17/872,408

(22) Filed: Jul. 25, 2022

(65) Prior Publication Data

US 2022/0355987 A1 Nov. 10, 2022

Related U.S. Application Data

(60) Division of application No. 15/445,523, filed on Feb. 28, 2017, now Pat. No. 11,414,249, which is a (Continued)

(51) Int. Cl.

*A24F 23/00* (2006.01)
*B65D 25/20* (2006.01)

(Continued)

(52) U.S. Cl.

CPC .......... *B65D 55/0818* (2013.01); *A24F 23/00* (2013.01); *B65D 25/205* (2013.01);

(Continued)

(58) Field of Classification Search

CPC ... B65D 55/0818; B65D 25/205; A24F 23/00; G09F 3/0341; G09F 3/10; G09F 2003/0272

(Continued)

(56) References Cited

U.S. PATENT DOCUMENTS 1,737,020 A * 11/1929 Peters .................. B65D 17/462 220/268
2,254,137 A * 8/1941 Biehn ..................... B60R 19/52 D12/171

(Continued)

FOREIGN PATENT DOCUMENTS

| | | | |
|---|---|---|---|
| EP | 2248736 | A1 | 11/2010 |
| EP | 2969827 | A1 | 1/2016 |
| WO | WO-2014150988 | A1 | 9/2014 |

OTHER PUBLICATIONS

International Preliminary Report on Patentability in International Application No. PCT/US2014/024711, mailed Sep. 24, 2015, 7 pages.

(Continued)

*Primary Examiner* — Jacob K Ackun

(57) ABSTRACT

Articles of manufacture, products, and packaging methods are provided that include a label with a tear strip. A labeled container includes a base, a lid, and a label sealing the base to the lid. The base includes a bottom wall and a base side wall. The lid includes a top wall and a lid skirt. The lid mates with the base to define an interior space. The label has a front face and a rear face. The label includes an outer web including polymer film, paper, or a combination thereof and an inner web of polymer. A tear strip is defined in the inner web by one or more weakened portion, score lines, or cuts in the inner web. The rear face of the label is adhesively bonded to the base side wall and to the lid skirt to form a seal between the base and the lid. The tear strip is positioned between a portion of the label adhesive bonded to the base side wall and a portion of the label adhesively bonded to the lid skirt. The tear strip can be used to open the container.

11 Claims, 10 Drawing Sheets

Related U.S. Application Data continuation of application No. 14/206,782, filed on Mar. 12, 2014, now abandoned.

(60) Provisional application No. 61/791,560, filed on Mar. 15, 2013.

(51) Int. Cl.

*B65D 55/06* (2006.01)
*B65D 55/08* (2006.01)
*G09F 3/03* (2006.01)
*G09F 3/10* (2006.01)
*G09F 3/02* (2006.01)

(52) U.S. Cl.

CPC ........... *B65D 55/06* (2013.01); *G09F 3/0341* (2013.01); *G09F 3/10* (2013.01); *G09F 2003/0222* (2013.01); *G09F 2003/0272* (2013.01); *Y10T 428/1303* (2015.01); *Y10T 428/1352* (2015.01)

(58) Field of Classification Search

USPC ...................................... 206/459.5, 242, 264

See application file for complete search history.

(56) References Cited

U.S. PATENT DOCUMENTS 2,554,137 A * 5/1951 Burton ................... B65D 75/66 383/207
3,189,214 A * 6/1965 Henchert ........... B65D 43/0293 206/508
3,822,492 A * 7/1974 Crawley ............... G09F 3/0288 283/105
3,873,018 A * 3/1975 Donnay ............. B65D 55/0854 215/246
3,917,276 A * 11/1975 Green Barg ............ A63F 3/069 283/903
4,098,421 A * 7/1978 Foster .................... B65D 41/18 220/784
4,351,433 A * 9/1982 Barber ................... B65D 75/66 383/207
4,420,080 A * 12/1983 Nakamura ......... B65D 75/5838 383/207
4,758,456 A * 7/1988 Muscala ............ B65D 55/0854 229/87.05
4,782,956 A * 11/1988 Yoshizawa ............. B65D 75/66 229/203
4,938,363 A * 7/1990 Amendola ........... B65D 77/003 229/87.05
4,947,994 A * 8/1990 Newsome .......... B65D 85/1027 229/203
5,082,702 A * 1/1992 Alband ................ B65D 55/026 139/420 R
5,135,790 A * 8/1992 Kaplan .................. B65D 75/66 229/238
5,460,287 A * 10/1995 Cargile .............. B65D 43/0256 215/354
5,515,965 A * 5/1996 Boldrini ................. B65D 77/32 229/87.13
5,836,697 A * 11/1998 Chiesa ................... B65D 75/66 383/66
6,000,539 A * 12/1999 Stewart-Cox ...... B65D 85/1045 206/268
6,228,458 B1 * 5/2001 Pinchen .................. B32B 27/36 206/245
6,334,711 B1 * 1/2002 Risgalla ................. B65D 75/30 426/123
6,354,739 B1 * 3/2002 Sheehan, Jr. .......... B65D 75/66 229/123.2
6,908,113 B2 * 6/2005 Chaduc ................. G09F 3/0292 206/460
6,918,532 B2 * 7/2005 Sierra-Gomez .... B65D 75/5838 383/203
7,049,962 B2 * 5/2006 Atherton ............ G08B 13/2414 340/572.1
7,392,899 B2 * 7/2008 Pham ................... B65D 5/6688 206/270
7,588,143 B2 * 9/2009 Focke .................... B65D 75/68 229/87.05
7,757,935 B2 7/2010 Clougherty
7,798,319 B1 * 9/2010 Bried ..................... B65D 51/16 220/366.1
7,878,324 B2 * 2/2011 Bellamah ............... B65D 15/18 220/4.27
D635,105 S * 3/2011 Maxik .......................... D13/179
8,215,482 B2 * 7/2012 Cronin ................... B65D 25/02 206/265
8,393,465 B2 * 3/2013 Clark ...................... A24F 23/00 206/265
8,469,187 B2 * 6/2013 Wattenbarger ....... A45C 13/008 206/242
8,556,070 B2 10/2013 Bried et al.
8,561,378 B2 * 10/2013 Bellamah ............... B65D 75/68 383/207
8,562,025 B2 * 10/2013 Drinkwater ............ B42D 25/29 283/102
8,562,216 B2 * 10/2013 Kendall ................. B65D 27/14 383/207
9,968,130 B2 * 5/2018 Potter ..................... B65B 29/00
2003/0081864 A1 * 5/2003 Baker ................ B65D 33/1691 383/211
2005/0045503 A1 * 3/2005 Wong ..................... B65D 55/06 206/308.2
2007/0023435 A1 * 2/2007 Sierra-Gomez .... B65D 77/2096 220/270
2007/0110928 A1 * 5/2007 Bried ..................... B65D 25/14 493/51
2007/0130811 A1 * 6/2007 Shevelev .................. G09F 3/10 40/638
2007/0295795 A1 * 12/2007 Clougherty ............ B65D 3/263 229/4.5
2008/0135428 A1 * 6/2008 Tallier ................ B65D 75/5827 383/207
2009/0091121 A1 * 4/2009 Urbanek ............... G09F 3/0341 283/81
2010/0012534 A1 * 1/2010 Hoffman ................ B65D 15/18 206/265
2010/0163563 A1 * 7/2010 Lutzig .................... B65D 5/563 220/495.01
2011/0303566 A1 * 12/2011 Gibson .............. B65D 43/0222 206/265
2013/0168440 A1 * 7/2013 Mills .................. B65D 75/5844 229/87.05
2014/0262903 A1 9/2014 Mitten et al.
2017/0166369 A1 6/2017 Mitten et al.

OTHER PUBLICATIONS

International Search Report and Written Opinion in International Application No. PCT/US2014/024711, mailed Jul. 3, 2014 (10 pages).

Canadian Office Action for Application No. 2,905,789, dated Mar. 2, 2020.

* cited by examiner

LABEL HAVING TEAR STRIP

CROSS-REFERENCE TO RELATED APPLICATIONS

This application is a divisional of U.S. patent application Ser. No. 15/445,523, filed Feb. 28, 2017, which is a continuation of U.S. patent application Ser. No. 14/206,782, filed on Mar. 12, 2014, which claims benefit of priority under 35 U.S.C. § 119(e) to U.S. Application No. 61/791,560 filed Mar. 15, 2013, the entire contents of each of which are incorporated herein by reference thereto.

TECHNICAL FIELD

This disclosure generally relates to labels having tear strips. In some cases, the labels having tear strips provided herein can be applied to containers containing smokeless tobacco (e.g., pouched smokeless tobacco).

BACKGROUND

Smokeless tobacco is tobacco that is placed in the mouth and not combusted. There are various types of smokeless tobacco including: chewing tobacco, moist smokeless tobacco, snus, and dry snuff. Smokeless tobacco products are often packaged in a cylindrical can having a base and a lid. The base and the lid can be sealed together with a label, which can improve shelf stability and provide tamper evidence. Adult Tobacco Consumers often open a container including smokeless tobacco by using a fingernail, key, knife, or other object to rip the label along the lower edge of the lid.

SUMMARY

Labels having tear strips, method of manufacturing labels having tear strips, containers having labels having tear strips, and packaging techniques are provided herein. A labeled container provided herein can include a base, a lid, and a label sealing the base to the lid. The base can include a bottom wall and a base side wall. The lid can include a top wall and a lid skirt. The lid can mate with the base to define an interior space. A label provided herein can have a front face and a rear face. The label provided herein can include an outer web including polymer film, paper, or a combination thereof and an inner web including polymer. A tear strip is defined by one or more weakened portion, score lines, or cuts in the inner web. The rear face of the label provided herein can be adhesively bonded to the base side wall and to the lid skirt to form a seal between the base and the lid. The tear strip provided herein can be positioned between a portion of the label adhesive bonded to the base side wall and a portion of the label adhesively bonded to the lid skirt. The tear strip can be used to open the container.

A container provided herein can be a container for smokeless tobacco. For example, smokeless tobacco can be deposited in the base of a container provided herein prior to the lid being mated with the base and a label provided herein applied to the container. In some cases, non-tobacco products can be placed in a container provided herein. In some cases, containers provided herein are cylindrical. In some cases, containers provided herein are elliptical, rectangular, or any other suitable shape. In some cases, a bottom wall of a base of a container provided herein can include a truncated cone shape. In some cases, a container provided herein includes polymer, paperboard, metal, or a combination thereof. For example, a base can include molded plastic, paperboard, or tinplate steel. For example, a lid can include molded plastic or tinplate steel. In some cases, the lid and/or base can be embossed or printed with product information. In some cases, the lid and the base can have a snap fit connection. In some cases, an upper surface of the lid can include a sealing ring to form an additional seal.

Labels provided herein can include any suitable material. In some cases, labels provided herein can include an outer web made of one or more polymer film and/or paper. In some cases, a front face of an outer web of the label provided herein can include printing to decorate the container and/or provide product information. For example, a front face of the label provided herein can include printed characters, symbols, warnings, or other indicia. In some cases, the outer web of a label provided herein is printed with one or more product safety and/or health warnings. An inner web provided herein can include a polymer. A tear strip defined in the inner web can include a polymer. In some cases, the outer web is adhesively bonded to the inner web. In some cases, a label provided herein includes additional webs adhesively bonded between the inner web and the outer web, which can include similar or dissimilar materials. The weakened areas, score lines, or cuts in the inner web defining the tear strip can be applied to the inner web prior to bonding the inner web to the outer web in order to avoid inadvertent cutting of the outer web, which could result in an improper seal between the lid and the base and compromise shelf stability of certain products.

Labels provided herein can include pull tabs. A pull tab can be formed as part of an outer web provided herein. For example, cuts in an outer web can define a pull tab. In some cases, a pull tab can project past a side edge of the outer web. The pull tabs provided herein can be aligned with the tear strip defined in the inner web. In some cases, an end portion of a tear strip is adhesively bonded to a rear side of a pull tab. In some cases, a tear strip provided herein extends along an entire length of an outer web provided herein.

Labels provided herein can provide a hinge portion. A hinge portion provided herein can be a portion of an outer web member that is not removed by the tear strip when the container is opened using the tear strip. A hinge portion provided herein can, in some cases, be defined by a side edge of the label, a cut in an outer web perpendicular to the tear strip, a portion of the label adhesive bonded to the base side wall, and a portion of the label adhesively bonded to the lid skirt. In some cases, a hinge portion provided herein is covered by an opposite side portion of the label prior to opening the labeled container. Having the hinge portion covered by an opposite side portion of the label can ensure that the container seal is not compromised by a cut in the outer web defining the hinge portion. In some cases, the tear strips provided herein do not extend along the hinge portion. In some cases, a tear strip provided herein is not adhesively bonded to the hinge portion of the web.

In some aspects, methods of making labels are provided. In some cases, a method provided herein can include printing on a front face of a first web including polymer film, paper, or a combination thereof, creating one or more weakened portions, scores, or cuts in a second web that includes a polymer to define a tear strip, bonding the second web defining the tear strip to a rear face of the first web to create a label, and applying a rear face of the label to a container or to a release sheet. Creating the weakened portions, scores, or cuts in the second web prior to connecting the second web to the first web can reduce the risk of the first web being compromised in a way that would threaten shelf stability. In some cases, the printing of the first web provided herein can be done before, after, or concurrent with creating the one or more weakened portions, scores, or cuts in the second web, bonding a second web to the rear face of the first web, or applying the label to a container or release sheet.

While the labels, containers, and methods provided herein are generally described in reference to smokeless tobacco, it should be understood that these labels, containers, and methods can also be used with other packaged products. For example, a container with a label having a tear strip provided herein can be used to package non-tobacco or "herbal" compositions, which may be used as an alternative to smokeless tobacco compositions. Non-tobacco products may include a number of different primary ingredients, including but not limited to, tea leaves, red clover, coconut flakes, mint leaves, ginseng, apple, corn silk, grape leaf, and basil leaf. In some cases, a non-tobacco product packaged in a container provided herein includes a non-tobacco material within a pouch. In some cases, a non-tobacco product can include one or more tobacco extracts. In some cases, tobacco extracts added to a packaged product can include nicotine. In some cases, a non-tobacco smokeless product packaged in a container provided herein can include an extract of tobacco including two or more tobacco organoleptic components.

Labels provided herein can include one or more of the following advantages. In some cases, a label provided herein can permit a sealed container including a label provided herein to be easily opened, without a need to use a fingernail, key, knife, or other object to cut the label or peal the label off. In some cases, a label provided herein can provide tamper evidence by indicating when a label has been opened. In some cases, a label provided herein provides a method of opening a smokeless tobacco container that is familiar to adult tobacco consumers. In some cases, a label provided herein can open to leave a hinge portion of the label, so that a lid can remain with the base. In some cases, labels provided herein can provide these advantages without compromising product shelf stability or product freshness. In some cases, labels provided herein can be used with existing labeling equipment (e.g., labeling equipment standard for labeling smokeless tobacco containers).

Unless otherwise defined, all technical and scientific terms used herein have the same meaning as commonly understood by one of ordinary skill in the art to which the methods and compositions of matter belong. Although methods and materials similar or equivalent to those described herein can be used in the practice or testing of the methods and compositions of matter, suitable methods and materials are described below. In addition, the materials, methods, and examples are illustrative only and not intended to be limiting. All publications, patent applications, patents, and other references mentioned herein are incorporated by reference in their entirety.

DESCRIPTION OF DRAWINGS

Like reference symbols in the various drawings indicate like elements.

DETAILED DESCRIPTION

Figure 1A:
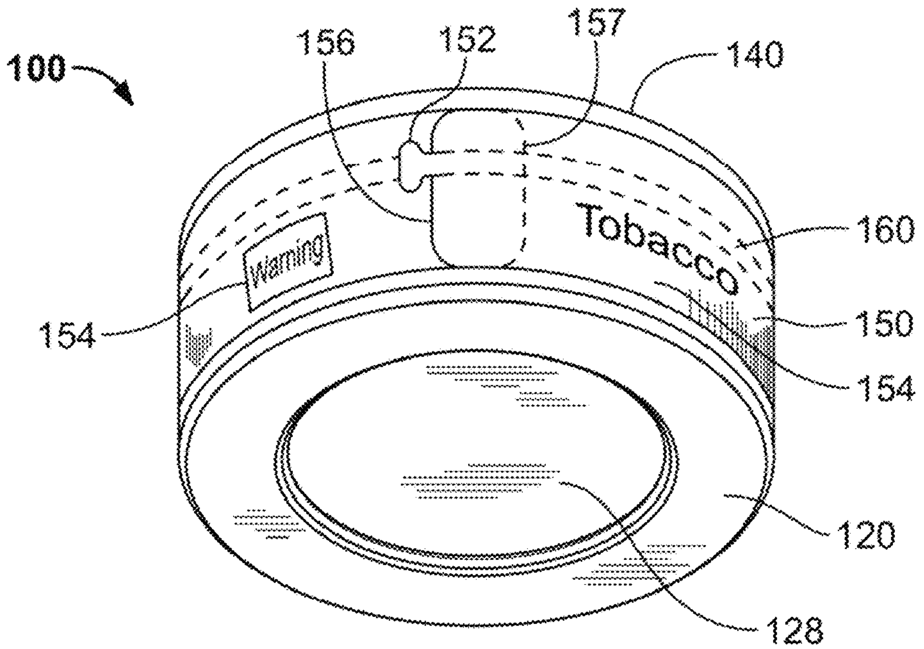
FIG. 1A is a perspective view of a labeled container provided herein.

Labels having tear strips, method of manufacturing labels having tear strips, products including containers having labels having tear strips, and packaging techniques for tobacco and non-tobacco products are provided herein.

Referring to FIGS. 1A-E, some embodiments of a tobacco container 100 can be used to maintain or enhance freshness and other product qualities of tobacco products (e.g., chewing tobacco, moist snuff tobacco (loose, pouch, or other articulations), dry snuff tobacco, or other smokeless tobacco products for oral consumption)) contained therein. Such qualities may relate to, without limitation, texture, flavor, color, aroma, mouth feel, taste, ease of use, and combinations thereof. The tobacco container 100 can include a container base 120, a lid 140, and a label 150 including a pull tab 152. The label can seal the lid 140 to the container base 120 so as to improve product freshness during shelf life. When sealed, the label 150 may serve as a moisture barrier that limits the egress of the moisture from the container base 120 (or the ingress of the moisture into the container base 120). In some circumstances, label 150 may provide a non-hermetic seal that provides a limited amount of gas exchange with the ambient air (e.g., to permit venting of evolved gases or the like). An inner web defining a tear strip 160 (identified by dotted lines) is adhesively bonded to a rear side of an outer web to guide the tearing of the label 150 when an adult tobacco consumer opens the container 100.

Figure 1B:
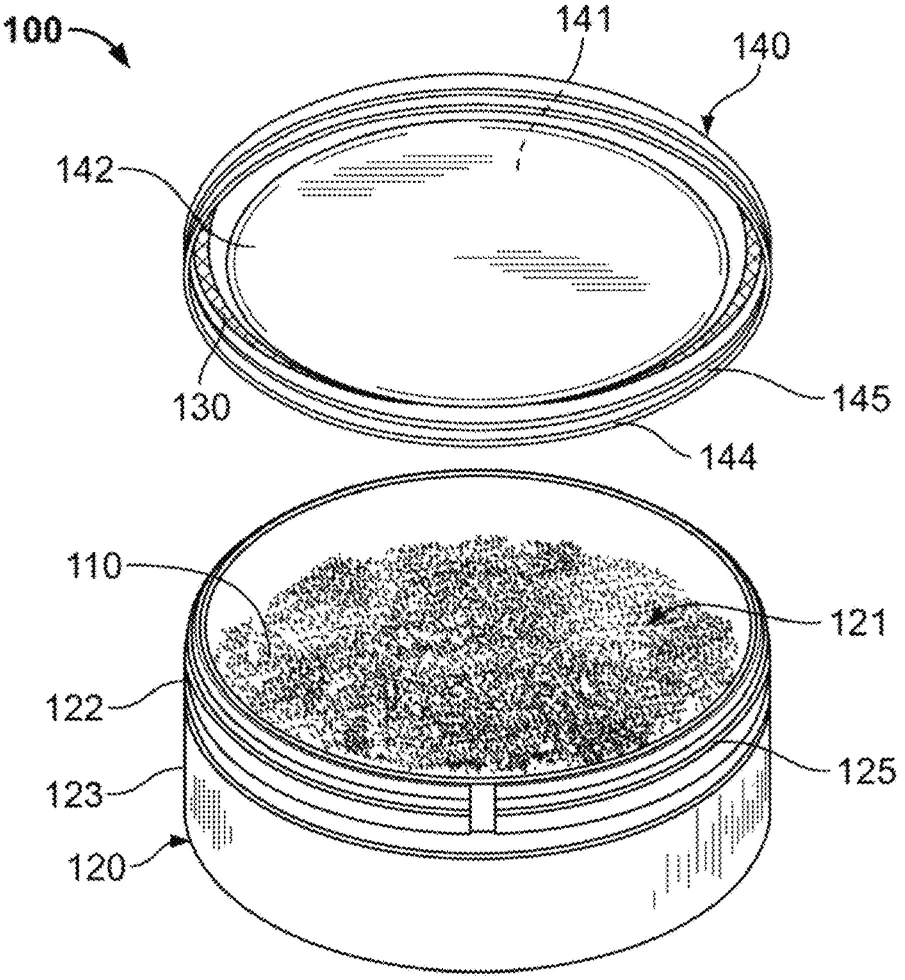
FIG. 1B is a perspective view of an unlabeled container in an open configuration and including a smokeless tobacco product.
Figure 1C:
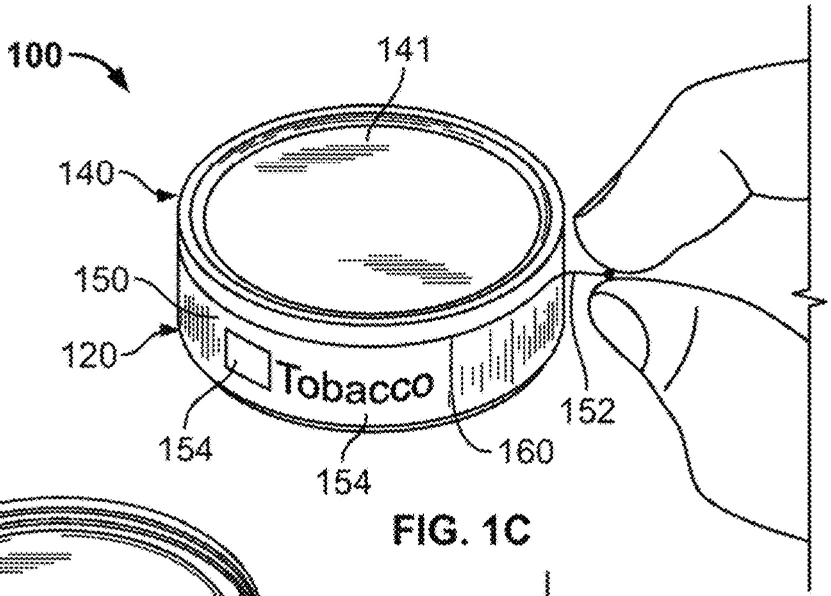
FIG. 1C depicts an adult tobacco consumer using a pull tab to open the container.
Figure 1D:
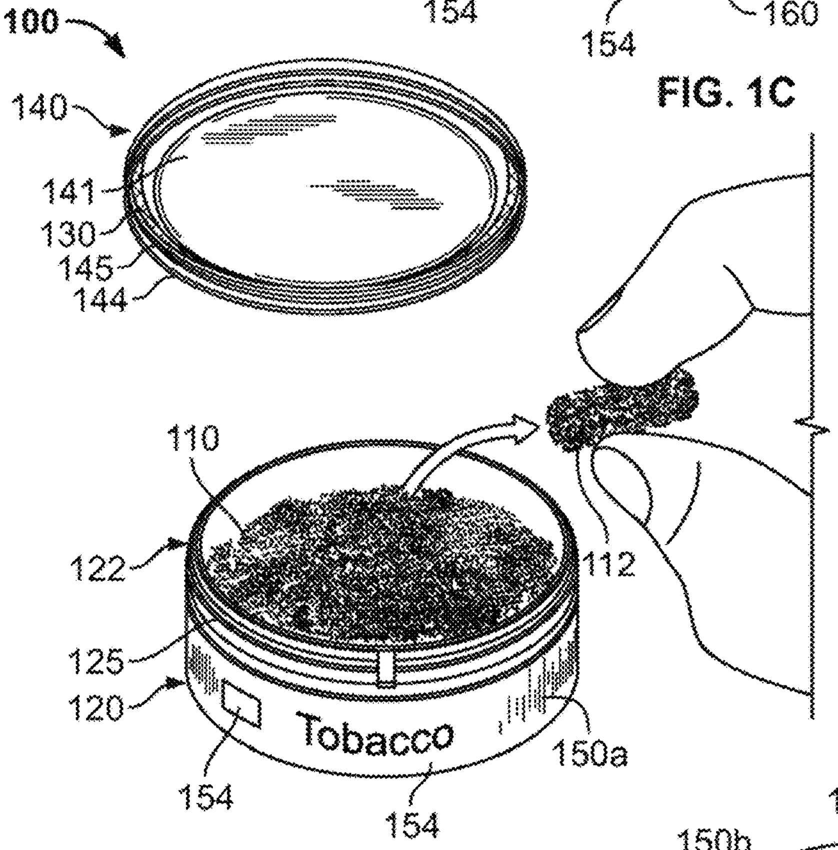
FIG. 1D depicts an adult tobacco consumer removing a pinch of smokeless tobacco from the container.
Figure 1E:
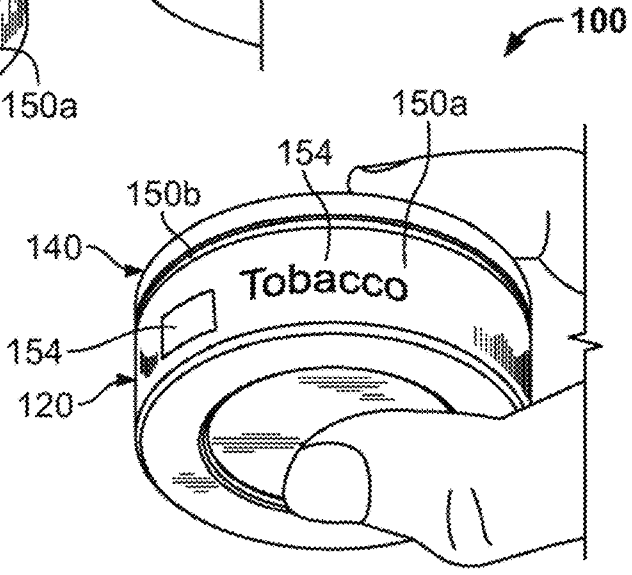
FIG. 1E depicts an adult tobacco consumer closing the container after removing a pinch of smokeless tobacco.

As shown in FIGS. 1B, 1D, and 1E, the container base 120 and lid 140 are matable with one another so that the container 100 can be closed and thereby retain tobacco or other products therein (refer, for example, to the moist snuff tobacco 110 illustrated in FIG. 1B and FIG. 1D). In this embodiment, the container base 120 has a generally cylindrical shape and includes a bottom wall and a cylindrical base side wall that at least partially defines an interior space 121. The container base 120 may comprise a material such as a polymer (e.g., polypropylene or the like), fiberboard, or metallic material that is suitable for storing tobacco products having one or more flavorants or volatile agents. In this embodiment, the container base 120 comprises a moldable polymer material. The container 100 can be arranged in a closed condition so that the container base 120 has a snap-fit engagement with the lid 140. Alternatively, the container base 120 can be configured to have a slide-lock engagement with the lid 140.

The lid 140 may include a metallic material (e.g., aluminum, tin, stainless steel, or the like). Alternatively, the lid 140 can be formed from a moldable polymer material such as polypropylene or the like. The lid 140 includes a lid wall 141 and a lid skirt 144 that extends from the circumference of the lid wall 141. In this embodiment, the lid skirt 144 includes a second bead 145 that mates with the container base 120 to releasably retain the lid 140 to the container base 120, thereby enclosing the snuff tobacco 110 or other tobacco products in the closed container 100. In some embodiments, the lid 140 can include a gasket 130, which can also assist in sealing the tobacco product packaging device 100.

As shown in FIG. 1A, a rear face of label 150 can be adhesively bonded to surfaces of both the lid 140 and the container base 120 to seal the container. A front face of the label 150 can include printing 154, which can include a host of different decorative or informative alphanumeric characters, symbols, patters, designs, or figures. In some cases, a container provided herein can include a health and/or safety warning. A pull tab 152 is provided as part of the label 150 to permit a user to break the seal and separate the lid 140 from the container base 120. Shown with dotted lines in FIG. 1A, a tear strip is defined by an inner web of the label, extended along the length of the label and around at least part of the periphery of the container base 120 and the lid 140. Opposite ends 156 and 157 of label 150 can overlap when placed on a product package. As shown in FIG. 1C, an adult tobacco consumer can grasp pull tab 152 and use tear strip 160 to split the label 150 along the interface between lid skirt 144 of lid 140 and the cylindrical base side wall of the container base 120, which results in the label being split into label top portion 150*b* and label bottom portion 150*a*. After obtaining some of the tobacco (FIG. 1D), the container 100 can be closed again (FIG. 1E). As shown in FIG. 1E, label top portion 150*b* and label bottom portion 150*a* can remain on the product packaging and continue to display information (e.g., product health or safety warnings). In some cases, select information on label 150 can be arranged on label 150 so that it does not become obscured by the removal of label material resulting from the opening of the product package using pull tab 150.

Label 150 can include an outer web including polymer film, paper, or a combination thereof that seals the exterior interface between the lid 140 and the container base 120. For example, a web including polymer film can impede the ingress or egress of moisture there through, thereby preserving the product freshness of the snuff tobacco 110 or other tobacco products contained in the container 100. In some cases, an outer web provided herein can be free of cuts, scores, or weakened portions. For example, an inner web defining a tear strip can be scored or cut prior to being adhesively bonded to the outer web in order to reduce a likelihood of the outer web being compromised. In some cases, an outer web provided herein can include weakened portions, scores, and cuts in portions of the label that overlap. Specific structures of labels provided herein are discussed below in reference to FIGS. 2A-8B.

Still referring to FIGS. 1A-E, the container base 120 includes a connection rim 122 that includes a first bead 125 (such as a locking ring depicted in FIG. 1B) to mate with the second bead 145 of the lid 140. The connection rim 122 can be integrally formed as part of the cylindrical base side wall of the container base 120. As shown in FIG. 1B, the gasket 130 can be affixed to an inner lid surface 142 so that the gasket 130 is position between the lid wall 141 and the connection rim 122 when the lid 140 mates with the container base 120. As such, the metallic lid 140 of this embodiment can be press-fit with the polymeric container base 120 so that the second bead 145 mates with the first bead 125 of the container base 120, thereby urging the lid wall 141 toward the container base 120. Because the lid wall 141 is urged toward the container base 120, the gasket 130 can be at least partially compressed between the metallic lid 140 and the polymeric container base 120 when the package device is in the closed condition. In this embodiment, the gasket 130 includes a ring-shaped structure arranged on the inner lid surface 142 so as to abut against a connection rim 122 of the container base 120. The gasket 130 comprises a generally resilient material that is affixed to the inner lid surface 142. For example, in this embodiment, the gasket 130 may comprise a plastisol composition that is formed into a ring of film along the inner lid surface 142. In alternative embodiments, the gasket 130 may comprise another material, such as a urethane material, an epoxy material, or a wax material.

In the particular embodiment shown in FIG. 1C, the tobacco container 100 can include a label 150 that secures the container base 120 and lid 140 together during the product shelf life. The label 150 can include a tear strip 160 that extends along the circumference of the container 100 so that a consumer can pull upon the pull tab 152 to facilitate opening of the container 100 at a region near the interface of the container base 120 and the lid skirt 144. Although FIG. 1C depicts the tear strip 160 as being visible, a tear strip 160 provided herein can be hidden by the outer web of the label.

As shown in FIG. 1D, the consumer can separate the lid 140 from the container base 120 so that the tobacco container 100 is in the opened condition. With the lid 140 removed, the consumer can access the tobacco product 110 stored in the container base 120. For example, in this embodiment the container base 120 is used to store a moist snuff tobacco 110, and the consumer can pinch a portion 112 of the snuff tobacco for personal usage while the remaining portion of the snuff tobacco 110 is retained in the container base 120.

As shown in FIG. 1E, after the consumer obtains a portion of the tobacco product 110, the consumer can return the tobacco container 100 to the closed condition. For example, the user can press the lid 140 over the connection rim 122 of the container base 120 to reengage the lid 140 with the container base 120 and to thereby enclose the remaining tobacco product 110 in the container 100. As shown in FIG. 1E, label portions 150*a* and 150*b* remain on the container 100.

Although the particular embodiment depicted in FIGS. 1A-E illustrate the tobacco product in the container 100 as being a moist snuff tobacco product, it should be understood from the description herein that any one of a number of tobacco products and non-tobacco products can be retained in the container 100. For example, the tobacco product arranged in the container 100 may comprise chewing tobacco, dry snuff tobacco, moist snuff tobacco (loose, pouch, or other articulations), or another smokeless tobacco product. The tobacco product can include tobacco that is whole, shredded, cut, cured, aged, fermented, pasteurized, pouched, or otherwise processed. In some embodiments, the tobacco contained in the container 100 may include portions of leaves, flowers, roots, stems, or extracts thereof of any member of the genus *Nicotiana*. Further, the tobacco may include an extract of tobacco that provides additional tobacco constituents (e.g., flavors, aromas, alkaloids, or the like). In some embodiments described herein, the tobacco product may include one or more components such as flavor extracts, flavor masking agents, bitterness receptor site blockers, receptor site enhancers, sweeteners, and additives such as chlorophyll, minerals, botanicals, or breath-freshening agents. In some cases, the container 100 can include non-tobacco products. A container with a label having a tear strip provided herein can be used to package non-tobacco or "herbal" compositions, which may be used an alternative to smokeless tobacco compositions. Non-tobacco products may include a number of different primary ingredients, including but not limited to, tea leaves, red clover, coconut flakes, mint leaves, ginseng, apple, corn silk, grape leaf, and basil leaf. In some cases, a non-tobacco product packaged in a container provided herein includes a non-tobacco material within a pouch. In some cases, a non-tobacco product can include one or more tobacco extracts. In some cases, tobacco extracts added to a packaged product can include nicotine. In some cases, a non-tobacco smokeless product packaged in a container provided herein can include an extract of tobacco including two or more tobacco organoleptic components.

Figure 2A:
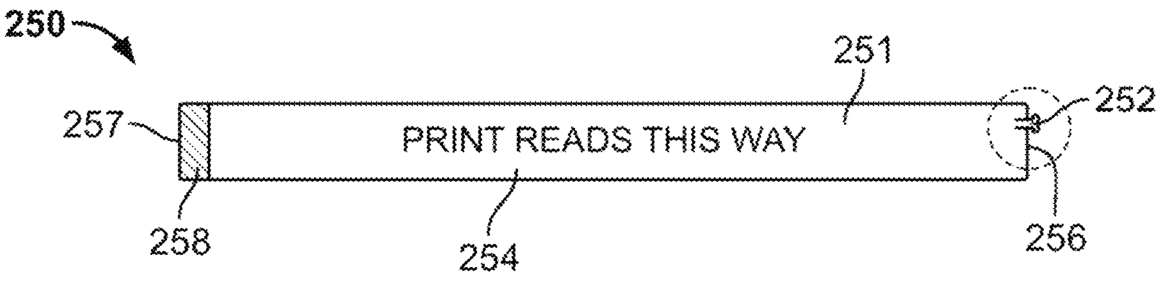
FIG. 2A is a front view of a first arrangement of a label provided herein.
Figure 2B:
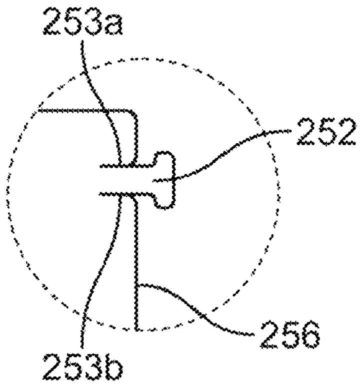
FIG. 2B is a detailed view of the pull tab of the label of FIG. 2A

FIGS. 2A-2E depict a label 250 having a first arrangement. FIG. 2A is a front view of label 250. As shown, an outer web 251 of polymer film, paper, or a combination thereof has a rectangular shape, including a first side edge 256 and a second side edge 257. Alphanumeric characters, symbols, patterns, designs, or FIG. 254 can be printed on outer web 251. A pull tab 252 is shown in FIG. 2A and shown in further detail in FIG. 2B. As shown, pull tab 252 can be a part of the outer web 251. As shown, the pull tab 252 project past side edge 256. In some cases, cuts 253*a* and 253*b* can be made in the web 251 to define pull tab 252 and to provide for tearing initiation of outer web 251 at the cuts 253*a* and 253*b*. Opposite sides of the label can overlap when applied to a container. For example, a portion of the front surface of outer web 251 can include an unvarnished surface 258, which will be adhered to a rear surface of the opposite end of label 250 when the label 250 is applied to a container.

Figure 2C:
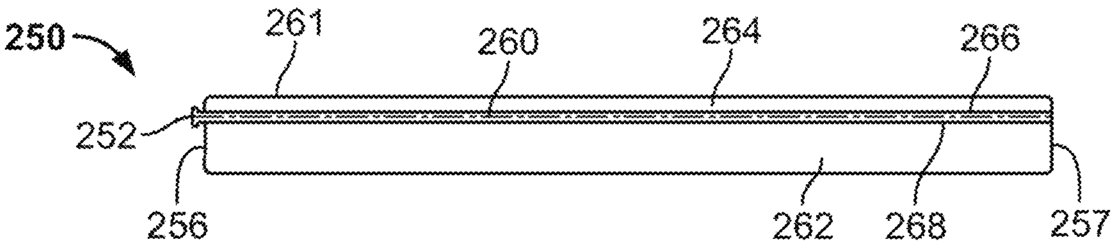
FIG. 2C is a rear view of the label of FIG. 2A.
Figure 2D:
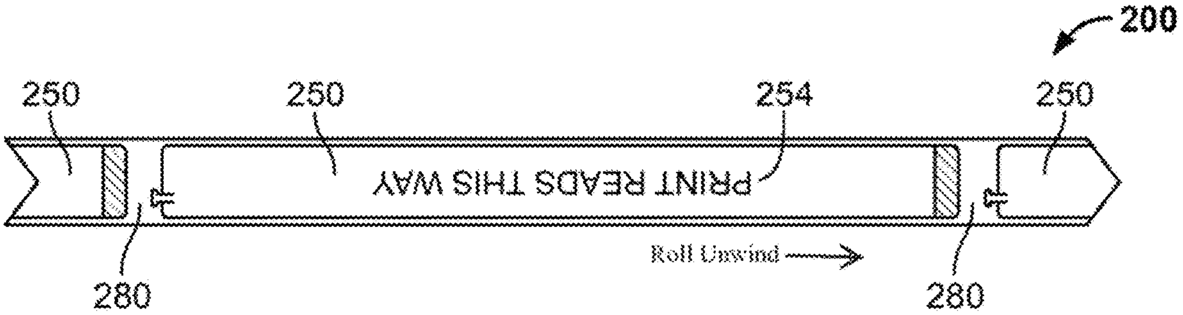
FIG. 2D is a front view of label stock including a plurality of labels having the arrangement of the label of FIG. 2A.

FIG. 2C depicts a rear view of label 250 having an inner web 261 adhesively bonded to a rear side of outer web 251. The inner web 261 can define a tear strip 260 between portions 262 and 264 of the inner web by including a series of weakened portions, scores, and/or cuts 266 or 268. Weakened portions, scores, and/or cuts 266 or 268 can be applied to the inner web 261 before the inner web 261 is applied to outer web 251 in order to ensure that the integrity of the outer web is not compromised. Weakened portions, cuts, or scores in the outer web 251 can compromise the seal between the lid and the container base and thus compromise the shelf life of a product. Moreover, weakened portions, cuts, or scores in the outer web 251 can alter the aesthetics of the label 250. Adhesive can be applied to portions 262 and 264 for application of the label to a container or to a release strip. FIG. 2D depicts a plurality of labels 250 applied to a release strip 280, which can be rolled up and used as a continuous supply 200 of labels in a standard labeling machine for labeling containers, such as typical smokeless tobacco containers.

Figure 2E:
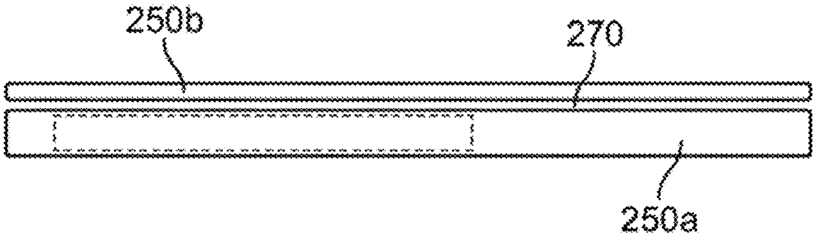
FIG. 2E is a diagram showing the portions of the label of FIG. 2A that will be visible after a container including the label of FIG. 2A is opened.

FIG. 2E is a diagram showing the portions of the label of FIGS. 2A-2D that will be present and visible after a container including such a label is opened. As shown, the label is split into two parts 250*a* and 250*b* with missing section 270 there between. In some cases, product information, health warnings, safety warnings, and other information is positioned on the label such that it is not removed by the tear strip when the container is opened.

Figure 3A:
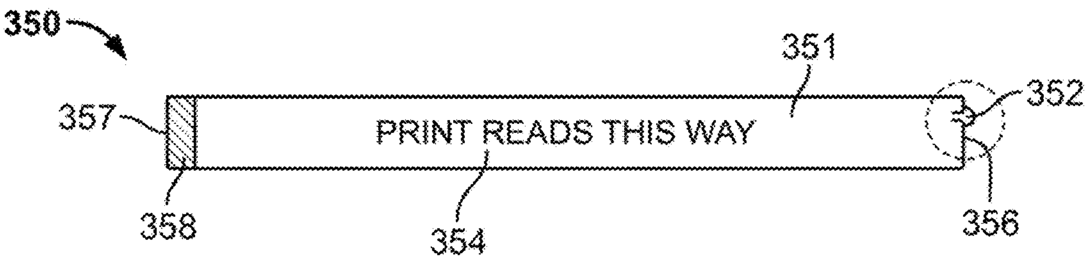
FIGS. 3A-3E depict a second arrangement of a label provided herein, label stock including a plurality of such labels, and the portions that will be visible after a container including the label is opened.
Figure 3B:
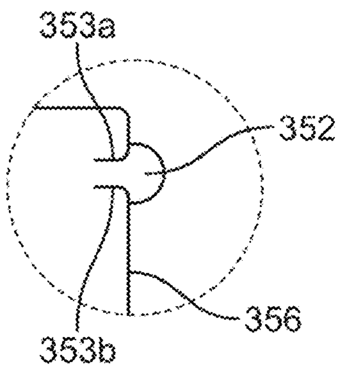

FIGS. 3A-3E depict a second arrangement of a label provided herein. FIG. 3A is a front view of label 350. As shown, an outer web 351 of polymer film, paper, or a combination thereof has a rectangular shape, including a first side edge 356 and a second side edge 357. Alphanumeric characters, symbols, patterns, designs, or FIG. 354 can be printed on outer web 351. A pull tab 352 is shown in FIG. 3A and shown in further detail in FIG. 3B. As shown, pull tab 352 can be a part of the outer web 351. As shown, the pull tab 352 project past side edge 356. In some cases, cuts 353*a* and 353*b* can be made in the outer web 351 to define pull tab 352 and to provide for tearing initiation of outer web 351 at the cuts 353*a* and 353*b*. Opposite sides of the label can overlap when applied to a container. For example, a portion of the front surface of outer web 351 can include an unvarnished surface 358, which will be adhered to a rear surface of the opposite end of label 350 when the label 350 is applied to a container.

Figure 3C:
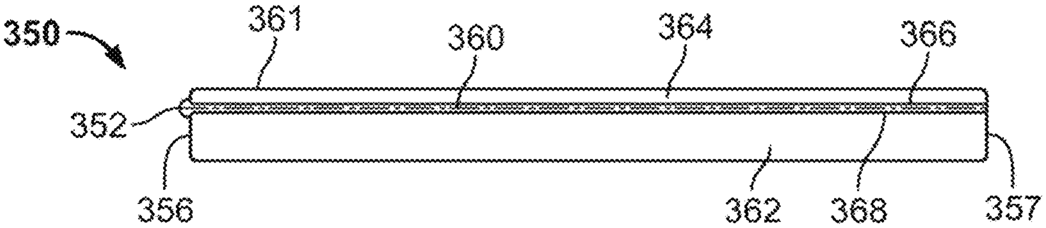
Figure 3D:
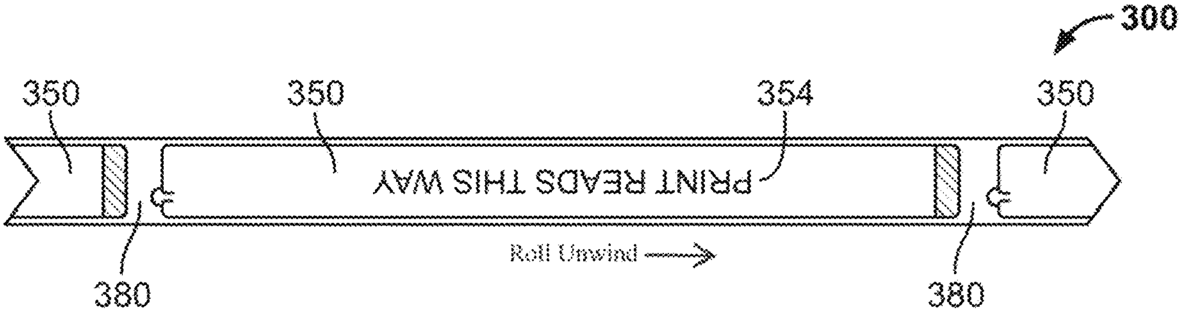

FIG. 3C depicts a rear view of label 350 having an inner web 361 adhesively bonded to a rear side of outer web 351. The inner web 361 can define a tear strip 360 between portions 362 and 364 of the inner web by including a series of weakened portions, scores, and/or cuts 366 or 368. Weakened portions, scores, and/or cuts 366 or 368 can be applied to the inner web 361 before the inner web 361 is applied to outer web 351 in order to ensure that the integrity of the outer web is not compromised. Weakened portions, cuts, or scores in the outer web 351 can compromise the seal between the lid and the container base and thus compromise the shelf life of a product. Moreover, weakened portions, cuts, or scores in the outer web 351 can alter the aesthetics of the label 350. Adhesive can be applied to portions 362 and 364 for application of the label to a container or to a release strip. FIG. 3D depicts a plurality of labels 350 applied to a release strip 380, which can be rolled up and used as a continuous supply 300 of labels in a standard labeling machine for labeling containers, such as typical smokeless tobacco containers.

Figure 3E:
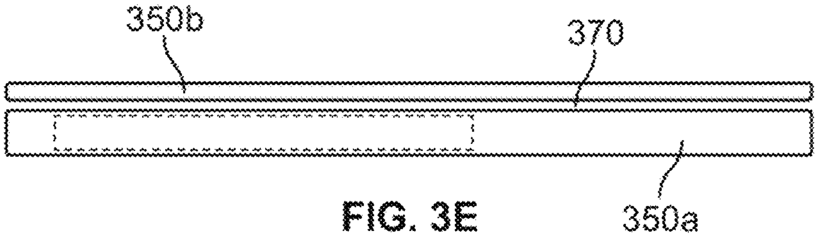

FIG. 3E is a diagram showing the portions of the label of FIGS. 3A-3D that will be present and visible after a container including such a label is opened. As shown, the label is split into two parts 350*a* and 350*b* with missing section 370 there between. In some cases, product information, health warnings, safety warnings, and other information is positioned on the label such that it is not removed by the tear strip when the container is opened.

Figure 4A:
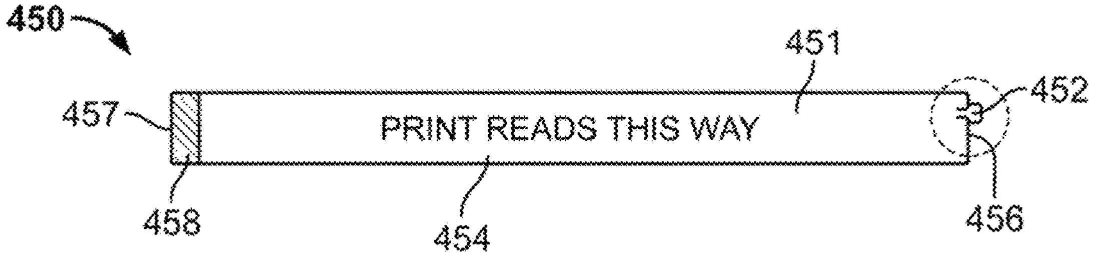
FIGS. 4A-4E depict a third arrangement of a label provided herein, label stock including a plurality of such labels, and the portions that will be visible after a container including the label is opened.
Figure 4B:
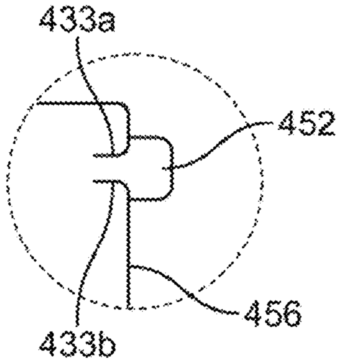

FIGS. 4A-4E depict a third arrangement of a label provided herein, label stock including a plurality of such labels, and the portions that will be visible after a container including the label is opened. FIG. 4A is a front view of label 450. As shown, an outer web 451 of polymer film, paper, or a combination thereof has a rectangular shape, including a first side edge 456 and a second side edge 457. Alphanumeric characters, symbols, patterns, designs, or FIG. 454 can be printed on outer web 451. A pull tab 452 is shown in FIG. 4A and shown in further detail in FIG. 4B. As shown, pull tab 452 can be a part of the outer web 451. As shown, the pull tab 452 project past side edge 456. In some cases, cuts 453*a* and 453*b* can be made in the outer web 451 to define pull tab 452 and to provide for tearing initiation of outer web 451 at the cuts 453*a* and 453*b*. Opposite sides of the label can overlap when applied to a container. For example, a portion of the front surface of outer web 451 can include an unvarnished surface 458, which will be adhered to a rear surface of the opposite end of label 450 when the label 450 is applied to a container.

Figure 4C:
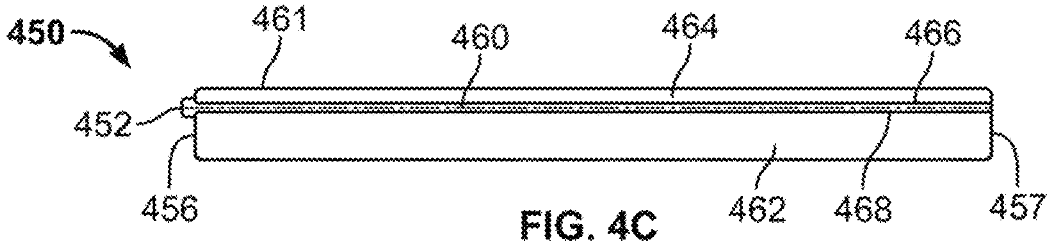
Figure 4D:
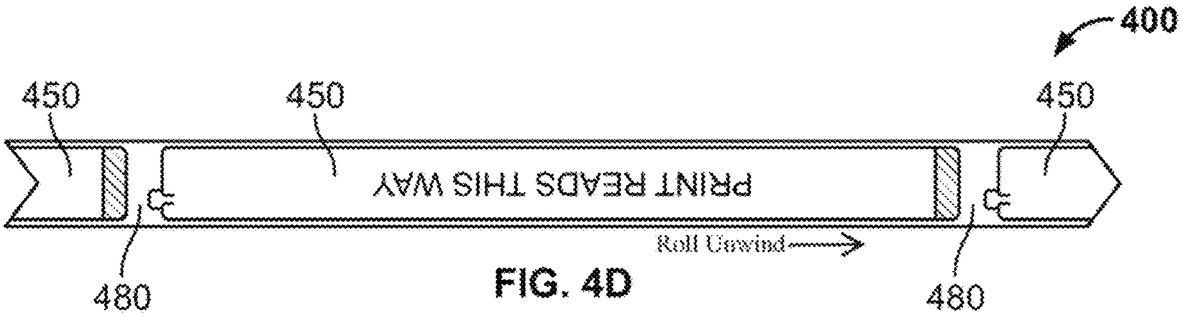

FIG. 4C depicts a rear view of label 450 having an inner web 461 adhesively bonded to a rear side of outer web 451. The inner web 461 can define a tear strip 460 between portions 462 and 464 of the inner web by including a series of weakened portions, scores, and/or cuts 466 or 468. Weakened portions, scores, and/or cuts 466 or 468 can be applied to the inner web 461 before the inner web 461 is applied to outer web 451 in order to ensure that the integrity of the outer web is not compromised. Weakened portions, cuts, or scores in the outer web 451 can compromise the seal between the lid and the container base and thus compromise the shelf life of a product. Moreover, weakened portions, cuts, or scores in the outer web 451 can alter the aesthetics of the label 450. Adhesive can be applied to portions 462 and 464 for application of the label to a container or to a release strip. FIG. 4D depicts a plurality of labels 450 applied to a release strip 480, which can be rolled up and used as a continuous supply 400 of labels in a standard labeling machine for labeling containers, such as typical smokeless tobacco containers.

Figure 4E:
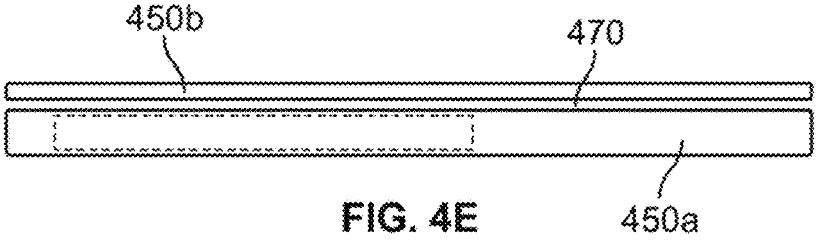

FIG. 4E is a diagram showing the portions of the label of FIGS. 4A-4D that will be present and visible after a container including such a label is opened. As shown, the label is split into two parts 450*a* and 450*b* with missing section 470 there between. In some cases, product information, health warnings, safety warnings, and other information is positioned on the label such that it is not removed by the tear strip when the container is opened.

Figure 5A:
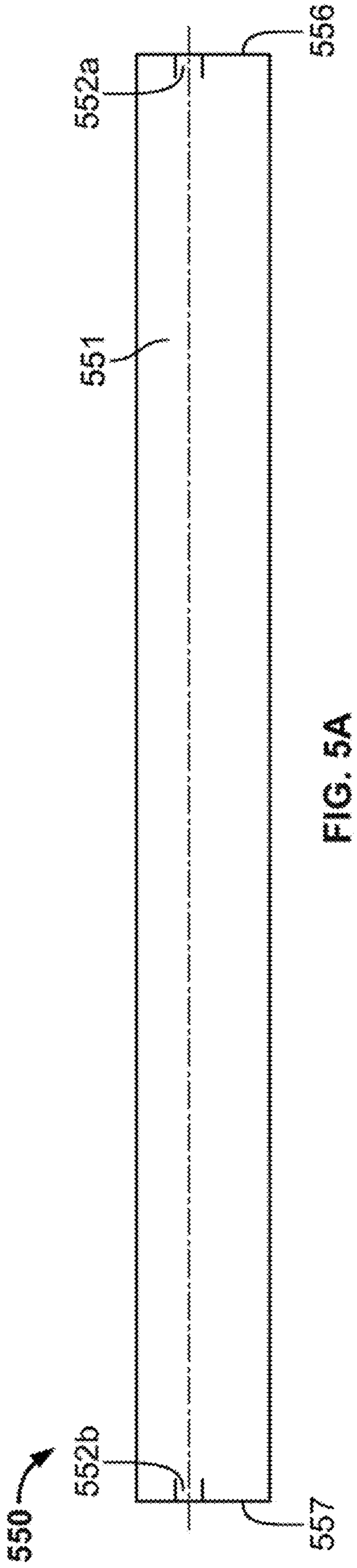
FIGS. 5A and 5B depict the front and back of a forth arrangement of a label provided herein.
Figure 5B:
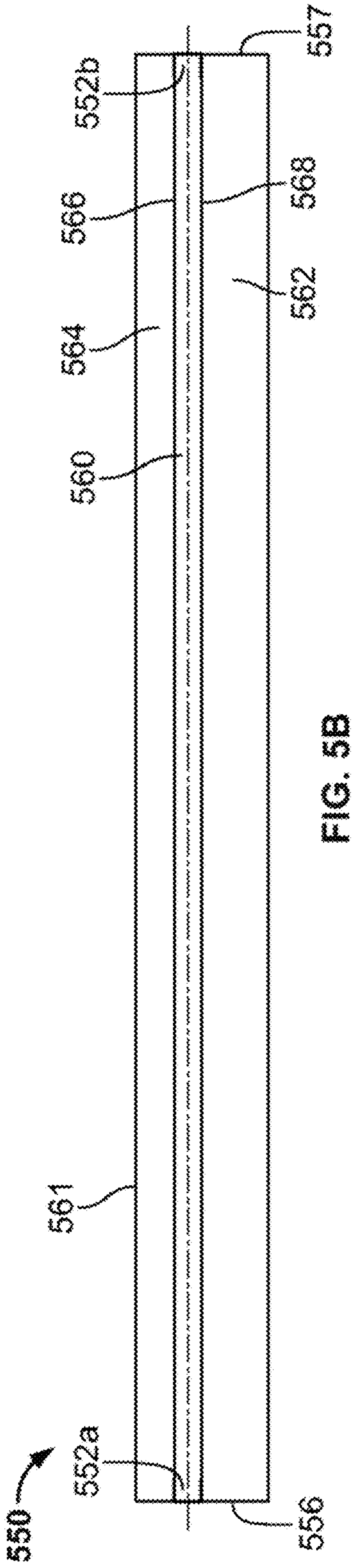

FIGS. 5A and 5B depict the front and back of a forth arrangement of a label 550 provided herein. As shown, an outer web 551 of polymer film, paper, or a combination thereof has a rectangular shape, including a first side edge 556 and a second side edge 557. Alphanumeric characters, symbols, patterns, designs, or FIG. can be printed on outer web 551. Pull tabs 552*a* and 552*b* are shown in FIG. 5A and FIG. 5B. As shown, pull tabs 552*a* and 552*b* occur in the section of the overlap, with one of them accessible regardless of which side is placed on top. Pull tabs 552*a* and 552*b* can be defined by cuts in the outer web 551.

FIG. 5B depicts a rear view of label 550 having an inner web 561 adhesively bonded to a rear side of outer web 551. The inner web 561 can define a tear strip 560 between portions 562 and 564 of the inner web by including a series of weakened portions, scores, and/or cuts 566 or 568. Weakened portions, scores, and/or cuts 566 or 568 can be applied to the inner web 561 before the inner web 561 is applied to outer web 551 in order to ensure that the integrity of the outer web is not compromised. Weakened portions, cuts, or scores in the outer web 551 can compromise the seal between the lid and the container base and thus compromise the shelf life of a product. Moreover, weakened portions, cuts, or scores in the outer web 551 can alter the aesthetics of the label 550. Adhesive can be applied to portions 562 and 564 for application of the label to a container or to a release strip.

Figure 6A:
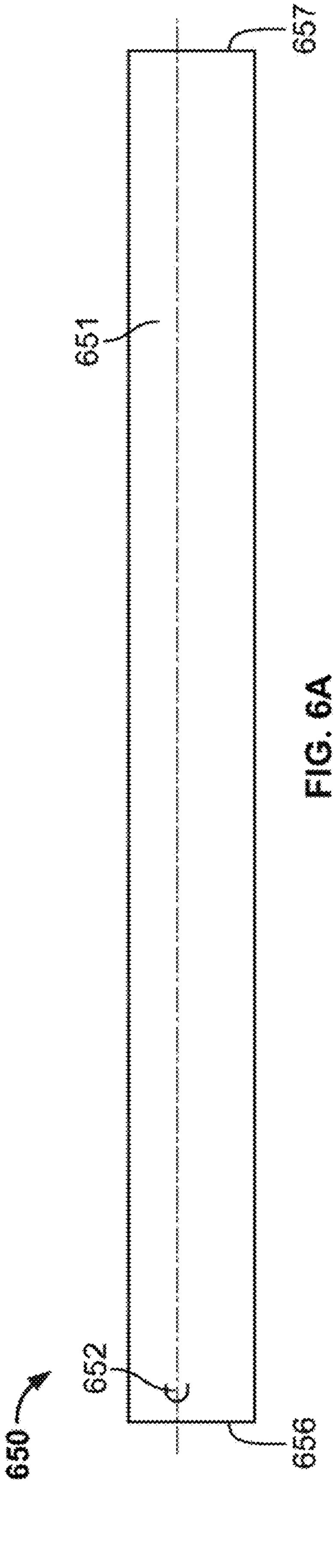
FIGS. 6A and 6B depict the front and back of a fifth arrangement of a label provided herein.
Figure 6B:
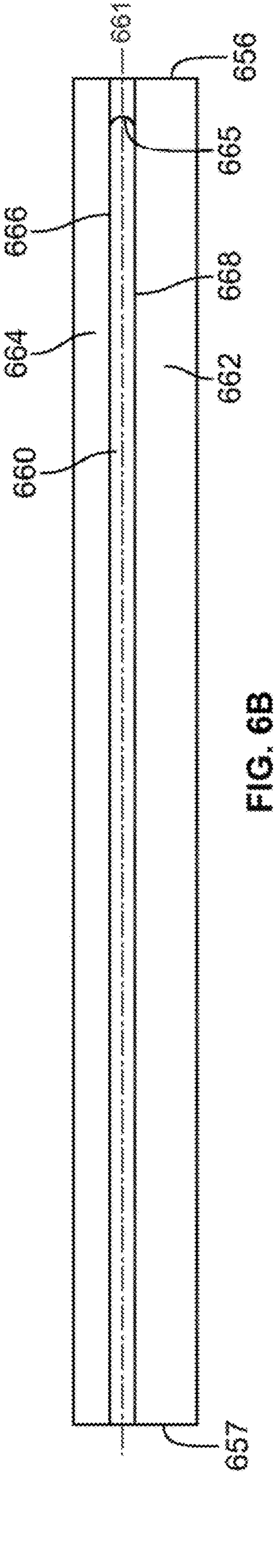

FIGS. 6A and 6B depict the front and back of a fifth arrangement of a label provided herein. As shown, an outer web 651 of polymer film, paper, or a combination thereof has a rectangular shape, including a first side edge 656 and a second side edge 657. Alphanumeric characters, symbols, patterns, designs, or FIG. can be printed on outer web 651. A pull tab 652 is shown in FIG. 6A. As shown, pull tab 652 is formed by a cut in the outer web 651 in a section of the outer web 651 that overlaps an opposite end of the label. As shown in FIG. 6B, the inner web 661 includes a corresponding cut 665 to defined the beginning of a tear strip 660.

FIG. 6B depicts a rear view of label 650 having an inner web 661 adhesively bonded to a rear side of outer web 651. The inner web 661 can define a tear strip 660 between portions 662 and 664 of the inner web by including a series of weakened portions, scores, and/or cuts 665, 666, and 668. Cut 665 can define the start of the tear strip and be positioned to have the start of the tear strip be adjacent to the pull tab 652 when the inner web 661 and outer web 651 are adhesively bonded together to make the label 650. Weakened portions, scores, and/or cuts 666 or 668 can be applied to the inner web 661 before the inner web 661 is applied to outer web 651 in order to ensure that the integrity of the outer web is not compromised. Weakened portions, cuts, or scores in the outer web 651 can compromise the seal between the lid and the container base and thus compromise the shelf life of a product. Moreover, weakened portions, cuts, or scores in the outer web 651 can alter the aesthetics of the label 650. Adhesive can be applied to portions 662 and 664 for application of the label to a container or to a release strip.

Figure 7A:
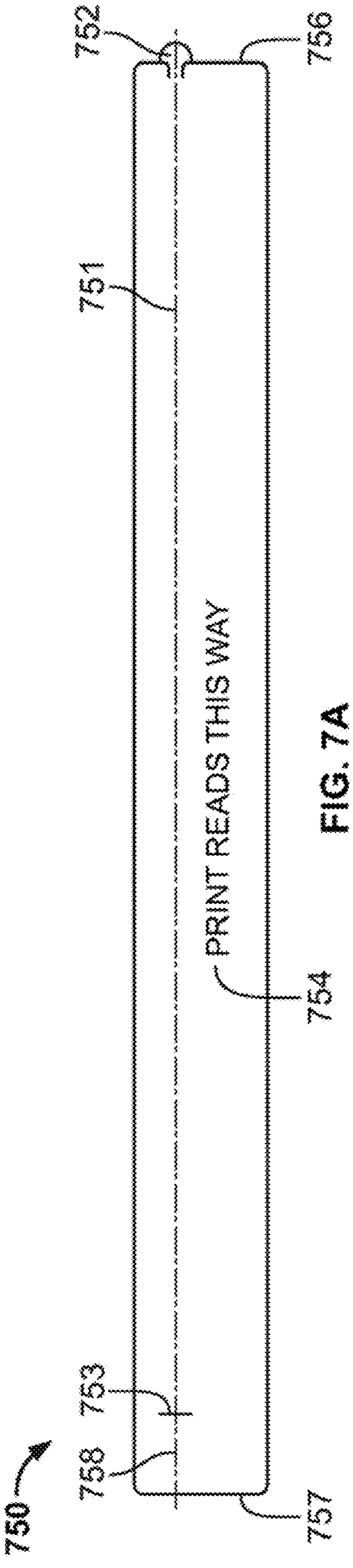
FIGS. 7A and 7B depict the front and back of a sixth arrangement of a label provided herein.
Figure 7B:
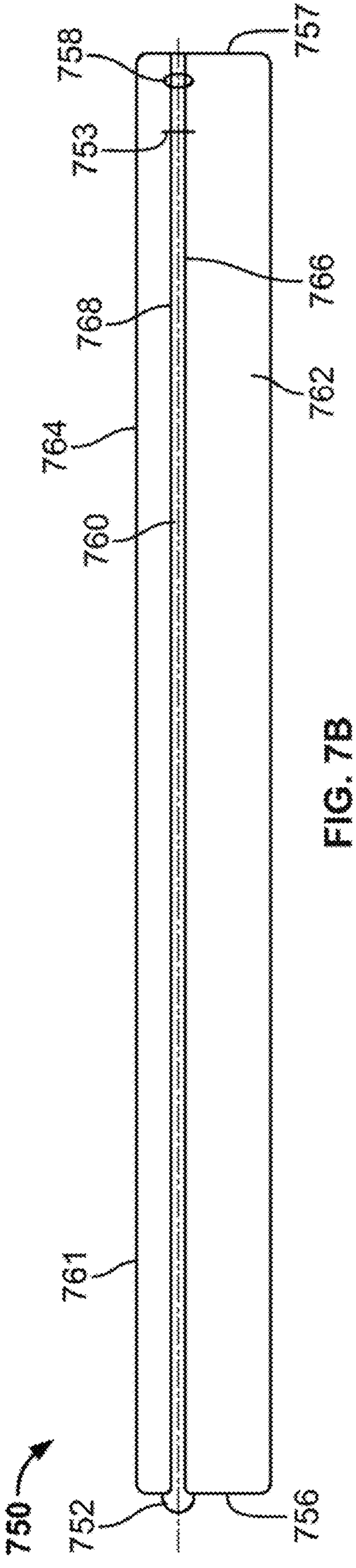

FIGS. 7A and 7B depict the front and back of a sixth arrangement of a label provided herein. As shown, an outer web 751 of polymer film, paper, or a combination thereof has a rectangular shape, including a first side edge 756 and a second side edge 757. Alphanumeric characters, symbols, patterns, designs, or FIG. 754 can be printed on outer web 751. A pull tab 752 projects past side edge 756. A cut 753 can be made in outer web 751 to define a hinge portion 758, which continues to connect the upper and lower portions of the label after the container is opened by using the tear strip 760. Cut 753 can ensure that pulling on the tear strip 760 does not tear the hinge portion 758 of the outer web 751 past the cut 753. As shown in FIG. 7B, cut 753 can extend through both the inner and outer webs. Cut 753 can be positioned in a portion of the label 750 that is overlapped when the label 750 is applied to a container so that cut 753 is covered by the opposite side of the label 750 and does not compromise the seal of a container. Cut 753 can be made after the inner web 761 is adhered to outer web 751 to form the label 750. In some cases the inner and outer webs can be separately cut to form cut 753.

FIG. 7B depicts a rear view of label 750 having an inner web 761 adhesively bonded to a rear side of outer web 751. The inner web 761 can define a tear strip 760 between portions 762 and 764 of the inner web by including a series of weakened portions, scores, and/or cuts 753, 766, and 768. Cut 753 can define the end of the tear strip and be positioned to have the end of the tear strip abut a hinge portion 758 of the label 750 when the inner web 761 and outer web 751 are adhesively bonded together to make the label 750. Weakened portions, scores, and/or cuts 766 or 768 can be applied to the inner web 761 before the inner web 761 is applied to outer web 751 in order to ensure that the integrity of the outer web is not compromised. Weakened portions, cuts, or scores in the outer web 751 can compromise the seal between the lid and the container base and thus compromise the shelf life of a product. Moreover, weakened portions, cuts, or scores in the outer web 751 can alter the aesthetics of the label 750. Adhesive can be applied to portions 762 and 764 for application of the label to a container or to a release strip.

Figure 8A:
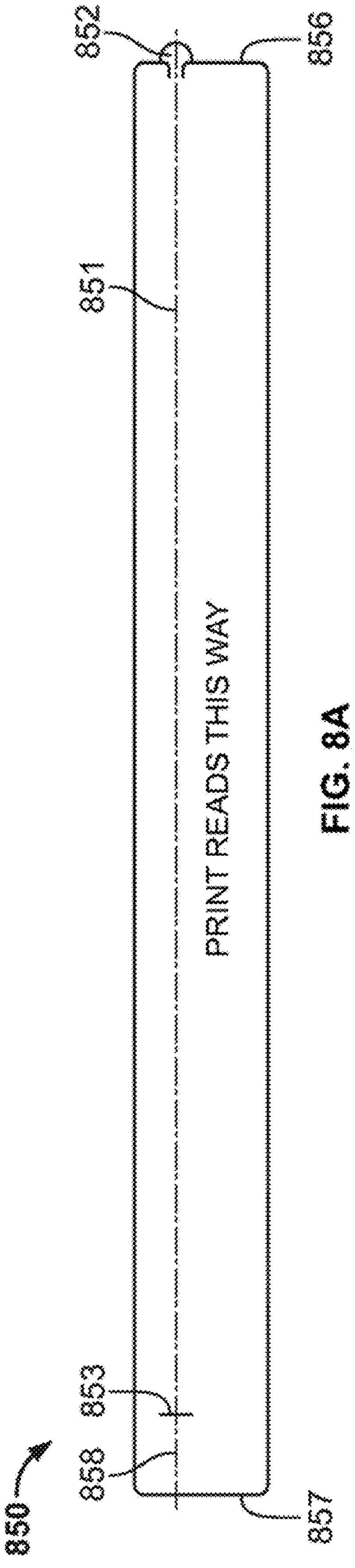
FIGS. 8A and 8B depict the front and back of a seventh arrangement of a label provided herein.
Figure 8B:
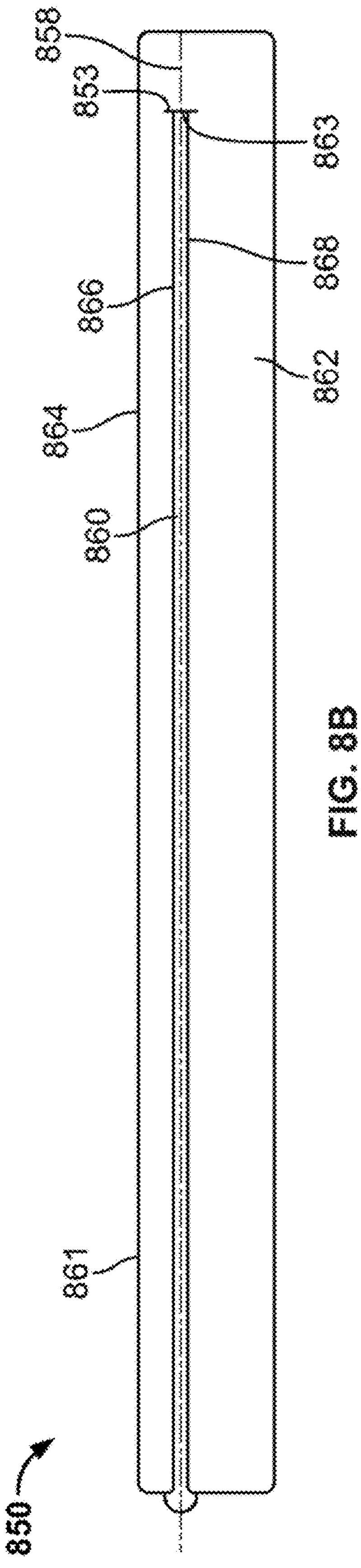

FIGS. 8A and 8B depict the front and back of a seventh arrangement of a label provided herein. As shown, an outer web 851 of polymer film, paper, or a combination thereof has a rectangular shape, including a first side edge 856 and a second side edge 857. Alphanumeric characters, symbols, patterns, designs, or FIG. can be printed on outer web 851. A pull tab 852 projects past side edge 856. A cut 853 can be made in outer web 851 to define a hinge portion 858, which continues to connect the upper and lower portions of the label after the container is opened by using the tear strip 860. Cut 853 can ensure that pulling on the tear strip 860 does not tear the hinge portion 858 of the outer web 851 past the cut 853. As shown in FIG. 8B, cut 853 can align with an end 863 of the tear strip. Cut 853 can be positioned in a portion of the label 850 that is overlapped when the label 850 is applied to a container so that cut 853 is covered by the opposite side of the label 850 and does not compromise the seal of a container. Cut 853 can be made before or after the inner web 861 is adhered to outer web 851 to form the label 850.

FIG. 8B depicts a rear view of label 850 having an inner web 861 adhesively bonded to a rear side of outer web 851. The inner web 861 can define a tear strip 860 between portions 862 and 864 of the inner web by including a series of weakened portions, scores, and/or cuts 866 and 868. An end 863 of the tear strip can abut a hinge portion 858 of the label 850 when the inner web 861 and outer web 851 are adhesively bonded together to make the label 850. Weakened portions, scores, and/or cuts 866 or 868 can be applied to the inner web 861 before the inner web 861 is applied to outer web 851 in order to ensure that the integrity of the outer web is not compromised. Weakened portions, cuts, or scores in the outer web 851 can compromise the seal between the lid and the container base and thus compromise the shelf life of a product. Moreover, weakened portions, cuts, or scores in the outer web 851 can alter the aesthetics of the label 850. Adhesive can be applied to portions 862 and 864 for application of the label to a container or to a release strip.

It is to be understood that, while the invention has been described herein in conjunction with a number of different aspects, the foregoing description of the various aspects is intended to illustrate and not limit the scope of the invention, which is defined by the scope of the appended claims. Other aspects, advantages, and modifications are within the scope of the following claims.

Disclosed are methods and compositions that can be used for, can be used in conjunction with, can be used in preparation for, or are products of the disclosed methods and compositions. These and other materials are disclosed herein, and it is understood that combinations, subsets, interactions, groups, etc. of these methods and compositions are disclosed. That is, while specific reference to each various individual and collective combinations and permutations of these compositions and methods may not be explicitly disclosed, each is specifically contemplated and described herein. For example, if a particular composition of matter or a particular method is disclosed and discussed and a number of compositions or methods are discussed, each and every combination and permutation of the compositions and the methods are specifically contemplated unless specifically indicated to the contrary. Likewise, any subset or combination of these is also specifically contemplated and disclosed.

What is claimed is:

1. A labeled container defining an interior space, the container comprising:

a base including a bottom wall and a base side wall;

a lid including a top wall and a lid skirt, the lid mating with the base to define an interior space; and a label having a front face and a rear face and a first end and a second end, the second end overlapping with the first end, the label including a web having a first side and an opposing second side, the second side of the inner web being adhesively bonded to the base side wall and to the lid skirt to form a seal between the base and the lid, a tear strip being defined by first score lines or first cuts in the web, the tear strip being positioned between a first portion of the web bonded to the base side wall and a second portion of the web adhesively bonded to the lid skirt, a pull tab being defined by second score lines or second cuts in the web, the pull tab aligned with the tear strip, a rear side of the pull tab being adhesively bonded to an end portion of the tear strip, and a hinge portion defined by a third cut in the web, the third cut being perpendicular to the tear strip, the hinge portion configured to connect upper and lower portions of the label after the container is opened by using the tear strip, the second end of the label including the hinge portion.

2. The container of claim 1, wherein the hinge portion of the label is covered by an opposite side portion of the label prior to opening the labeled container.

3. The container of claim 1, wherein the tear strip extends past the third cut in the outer web.

4. The container of claim 1, wherein the tear strip does not extend along the hinge portion.

5. The container of claim 1, wherein the tear strip does not extend to the hinge portion.

6. The container of claim 1, wherein the base and the lid each includes a polymer, a paperboard, a metal, or any combination thereof.

7. The container of claim 6, wherein the web includes a polymer film, a paper, or a combination of the polymer film and the paper.

8. The container of claim 7, wherein the polymer includes polypropylene.

9. The container of claim 1, wherein the tear strip extends along an entire length of the web.

10. The container of claim 1, wherein a second end of the label overlaps a first end of the label, the second end of the label including the hinge portion.

11. The container of claim 1, wherein the front face of the label includes alphanumeric characters, symbols, patterns, designs, figures, or any combination thereof.

* * * * *